United States Patent

[11] 3,600,513

[72] Inventors Charles R. Pendred
Pennsauken, N.J.;
Stephen Marrs Petty, Albuquerque, N. Mex.
[21] Appl. No. 742,563
[22] Filed July 5, 1968
[45] Patented Aug. 17, 1971
[73] Assignee RCA Corporation

[54] PROCESS FOR RAPID RECORDING OF POLYGONAL IMAGES
2 Claims, 9 Drawing Figs.

[52] U.S. Cl. 178/15, 95/12
[51] Int. Cl. G08c 21/00, H04l 21/04
[50] Field of Search 95/12; 178/15, 6.6, 6.8; 340/324, 324.1

[56] References Cited

UNITED STATES PATENTS 3,422,419 1/1969 Mathews et al. 178/6.8
3,330,182 7/1967 Gerber et al. 95/1

*Primary Examiner*—Kathleen H. Claffy
*Assistant Examiner*—Thomas L. Kundert
*Attorney*—H. Christoffersen

ABSTRACT: A process for recording a solid polygonal image on an imaging medium. An artwork tool or apparatus illustrated as an automatic drafting system with an imaging instrument shown as a photoexposure head is employed. The photoexposure head is capable of recording images of different shapes and widths. According to the process, an image of the polygon is formed on the imaging medium by recording a number of smaller adjacent polygonal images which integrally form the image of the overall polygon. The polygon to be recorded is partitioned into a number of integral parts. The time required by the artwork tool to form the image is reduced by selecting the integral parts as rectangles whenever practical so that major portions of the polygonal image can be formed with the widest available images which will fit within a particular rectangle.

INVENTORS
CHARLES R. PENDRED &
STEPHEN MARRS PETTY
BY Robert R. Hubbard
ATTORNEY INVENTORS
CHARLES R. PENDRED &
STEPHEN MARRS PETTY
BY Robert R. Hubbard
ATTORNEY INVENTORS
CHARLES R. PENDRED &
STEPHEN MARRS PETTY
BY Robert R. Hubbard
ATTORNEY

PROCESS FOR RAPID RECORDING OF POLYGONAL IMAGES

BACKGROUND OF INVENTION

The present invention relates to the art or process of rapidly generating art pattern images which include solid or filled polygons on an imaging medium. While the invention is applicable to the generation of patterns of the so-called fine arts, it is particularly useful in the industrial design arts for precision generation of artwork useful, for example, for forming masters which may be employed in fabricating printed circuit boards, integrated circuits, encoders, and the like.

Artwork generation techniques have employed various tools or apparatus to achieve speed as well as accuracy. One type of artwork apparatus includes control means for causing a relative displacement between an imaging instrument and an imaging medium holder in order to form an image of a pattern on the medium. In one form of the artwork apparatus, the medium holder is stationary and the control means either manually or automatically imparts pattern creating movements to the instrument in a plane parallel to a surface of the medium.

The choice of imaging instrument and medium are somewhat dependent upon one another. For example, when the instrument is a pen or pencil, the medium could be paper or other suitable sheet material. If the instrument is a cutting tool, such as a knife, the medium could be a sheet of red material laminated to a sheet of transparent material. Another type of instrument which may be employed is a light emitting source, such as a photoexposure head. The imaging medium for a photoexposure head could be any suitable light responsive material, such as photographic film.

In the aforementioned Rosenfeld et al. application, there is described a process utilizing such a tool having a photoexposure head for forming images of solid or filled polygons with relatively accurate edge definition. According to the Rosenfeld et al. application, the image of a solid polygon is formed by recording an outline image and then recording in succession a number of interior overlapping border images such that the outline image and all of the border images integrally form the overall polygonal image. The outline image has a relatively small width so that the polygonal edges are relatively accurate. The widths of the interior border images are determined by the amount of desired overlap and the image beam width or size which will fit within the smallest interior angle. Each successive interior border image can have a larger width than that of its most immediate preceding border image as more exposed film area is available for overlap. An advantage of this type of imaging process is that the plotting points required can be efficiently computed by means of automatic calculators since similar calculators are required for each successive image. The plotting time (the time required for the artwork tool to form the image) could be reduced, however, if the image width were dependent primarily on the width of the area to be exposed rather than the size of the smallest interior angle.

An object of the invention is to provide a novel and improved process for forming on an imaging medium an art pattern image which includes a solid polygon.

Another object is to provide a polygonal imaging process which selectively employs the maximum size image available to record a solid image on a given area of the imaging medium.

BRIEF SUMMARY OF THE INVENTION

In brief, the process of the present invention employs an art work generation tool which includes an image producing means for forming on an imaging medium an art pattern image which includes a solid polygon. In the first step of the process, the image producing means is initialized in recording relationship to the medium. That is, the image producing means is moved to an appropriate location relative to the medium and conditioned for recording. In another step of the process, the solid polygon image is formed on the medium by recording a number of smaller, adjacent, polygonal images of which at least a desired portion are rectangular. The smaller polygonal images integrally form the overall solid polygonal image. By breaking the polygon into as many rectangular shapes as desired, the size of the image width is limited primarily by the width of the rectangle, the desired degree of overlap of adjacent images and the available image widths. The smaller rectangular images are then formed by recording at least one bar-shaped image extending along the length of the rectangle. If further unimaged areas of the rectangle remain, further lengthwise bar images are recorded until the rectangular image is formed. According to one embodiment of the invention, one boundary of one of the rectangular images is an interior extension of one of the sides of a reentry angle when the polygon to be recorded is reentrant. The term "reentrant polygon" is defined as a polygon having an interior reentrant angle, that is, an angle which is greater than 180°.

BRIEF DESCRIPTION OF THE DRAWINGS

In the accompanying drawing, like reference characters denote like elements, and.

The artwork generation process of the present invention is useful in various applications where artwork generating tools are employed. As a brief example of an industrial design application, consider the fabrication of an integrated circuit product. A product designer prepares to scale a number of artwork patterns, one or more of which may represent the layout or topological arrangement of diffused regions for an integrated circuit substrate. The designer created pattern, for example, may be prepared on any suitable imaging medium, such as standard drafting paper, sheets of transparent material (e.g., Mylar), and the like. An artwork generating tool is then employed to transcribe the designer created pattern with precision onto a preliminary master sheet. The precision pattern on the preliminary master sheet is then replicated, as by contact printing, photographic reduction or other suitable techniques, until a working master of the required size is obtained. The working master is then employed in the fabrication of the diffused regions in or on the integrated circuit substrate in accordance with the precision artwork pattern.

The process of the present invention may be practiced with any desired artwork generating apparatus which has an image producing means, for recording images on an imaging medium. The image producing means, for example, could be an electron beam in a cathode ray tube, a light beam, a pen or other suitable imaging instrument. However, by way of example and completeness of the description, the invention is illustrated as employing a light beam producing image instrument in a drafting system having either a keyboard input or an information bearing tape input. Drafting systems of this type are generally available, for example, the Gerber Series 1000 Model 1032 Automatic Drafting Machine.

Figure 1:
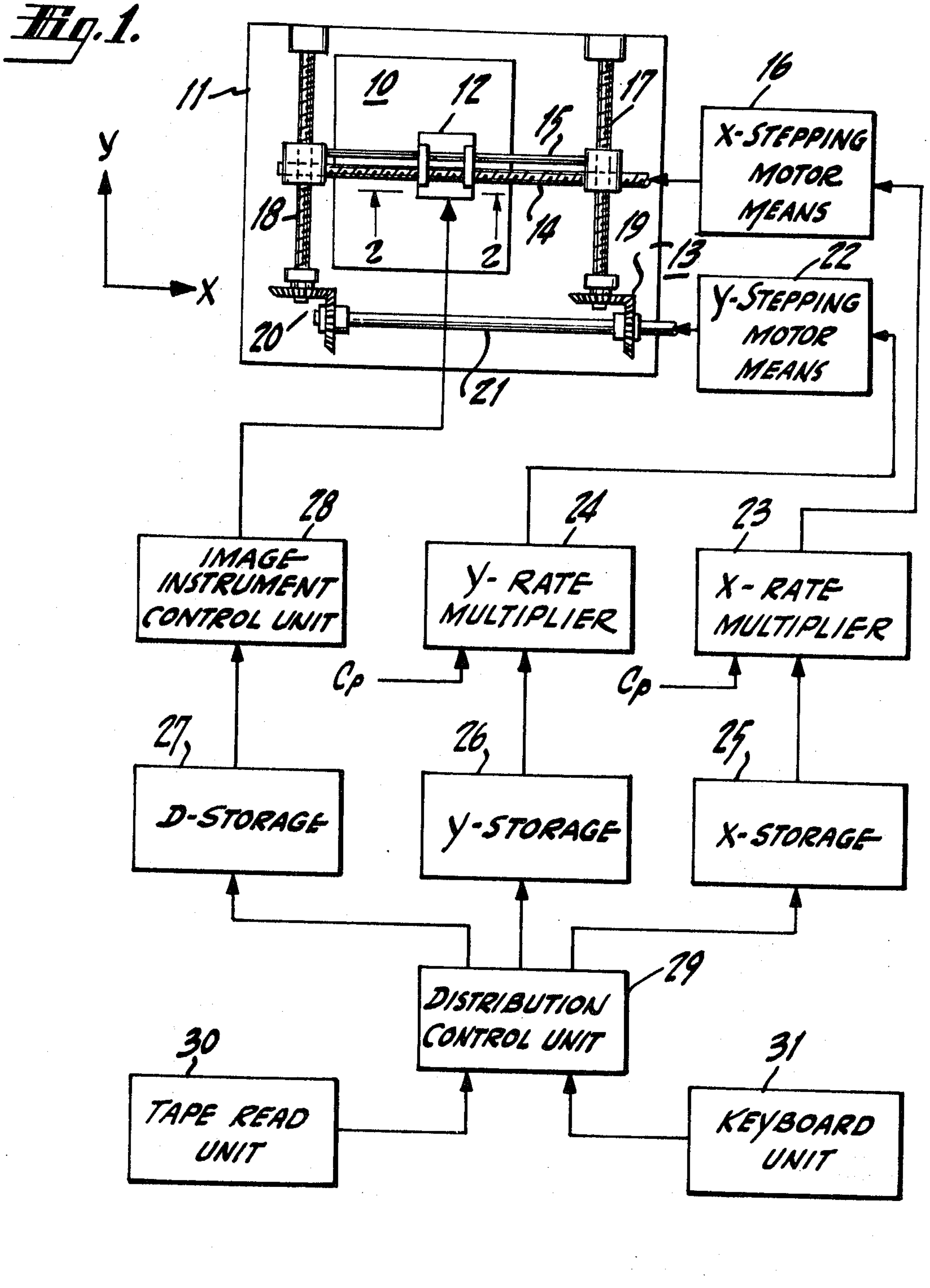
FIG. 1 is a block diagram and plan view of an artwork generating tool which may be employed in the practice of the present invention.

Referring now to FIG. 1 for a brief description of an artwork generating tool, an imaging medium 10 is positioned on the surface of a medium holder or support table 11. The imaging medium 10 can be a sheet of any high contrast photographic film, such as the one sold under the Trademark, KODALITH, as Ortho Film, Type 3.

An imaging instrument, illustrated as a photoexposure head 12, is supportably mounted above the film 10 and table 11 by means of a lead screw and drive arrangement 13 for imparting motion to the instrument or head 12 relative to and in a plane parallel to the film 10. The lead screw drive arrangement 13 includes a first lead screw 14 and a guide rod 15 upon which the imaging instrument 12 is suitably mounted. The lead screw 14 is driven by an X-stepping motor means 16 so as to impart motion to the instrument 12 in the horizontal (hereinafter called X) direction. The lead screw 14 and guide rod 15 are mounted by suitable means at each end thereof to lead screws 17 and 18. The lead screws 17 and 18 are each mounted by suitable means at different sides of the surface of table 11 and are each mechanically coupled by the illustrated gears 19 and 20 to a drive shaft 21. The drive shaft 21 is driven by a Y-stepping motor means 22 so as to rotate the lead screws 17 and 18 and thereby impart motion to the lead screw 14 and imaging instrument 12 in the vertical (hereinafter called Y) direction.

The X and Y motor means consist of one or more suitable stepping motors which are responsive to digital signals applied thereto from X and Y rate multiplier units 23 and 24. The X and Y rate multipliers each have one input to which clock signals designated $C_p$ are applied. The other inputs of the X and Y rate multipliers 23 and 24 receive X and Y command signal sets which are stored in X and Y storage units 25 and 26, respectively. The X and Y command signal sets are indicative of commands expressed in numerical form (e.g., as binary numbers) for moving the instrument 12 certain distances in the X and Y directions, respectively, in order to provide any desired pattern of motion. The X and Y rate multipliers essentially multiply the X and Y command signal sets by the clock signal $C_p$ to provide a train of X and a train of Y drive signals to drive the X and Y motor means. For the purpose of the description which follows, the command signal sets will be variously referred to as command numbers, commands, X number or Y number.

The distance and direction of motion of the instrument 12 is therefore controlled by the X and Y command signal sets. For example, if neither the X nor Y command number is zero, the instrument 12 is driven in both the X and Y directions for selected distances at selected rates in order to travel the desired distance in the desired direction. If the X number is zero and if the Y number is not zero, the instrument is driven only in the Y direction. On the other hand, if the Y number is zero and the X number is not zero, the instrument 12 is driven only in the X direction.

A D storage unit 27 is also provided to store a D command signal set or D number. An image instrument control unit 28 is responsive to the D number for controlling various conditions of the instrument or photoexposure head 12. For example, a light beam in the head 12 can be turned on and off or operated in a flashing mode in accordance with the D number value.

The X, Y and D numbers are entered into their respective storage units via a distribution control unit 29 from either of a pair of input devices illustrated as a tape read unit 30 and a keyboard unit 31. The tape read unit 30 may be either a magnetic or a paper tape reader which reads the X, Y and D numbers which are recorded in successive information blocks on the tape for successive movements of the head 12. The distribution control unit 29 then responds to each block of information to distribute the X, Y and D numbers to the appropriate storage units 25, 26 and 27. The command numbers may also be entered by an operator via the keyboard unit 31. The distribution control unit 29 similarly responds to keyboard entry of command numbers to distribute them to the appropriate storage units 25, 26 and 27. Suitable timing means, not shown, is operative upon receipt of each new block of information by the distribution control unit to effect transfer to the storage units as well as proper operation of the X and Y rate multipliers and the image instrument control unit.

Figure 2:
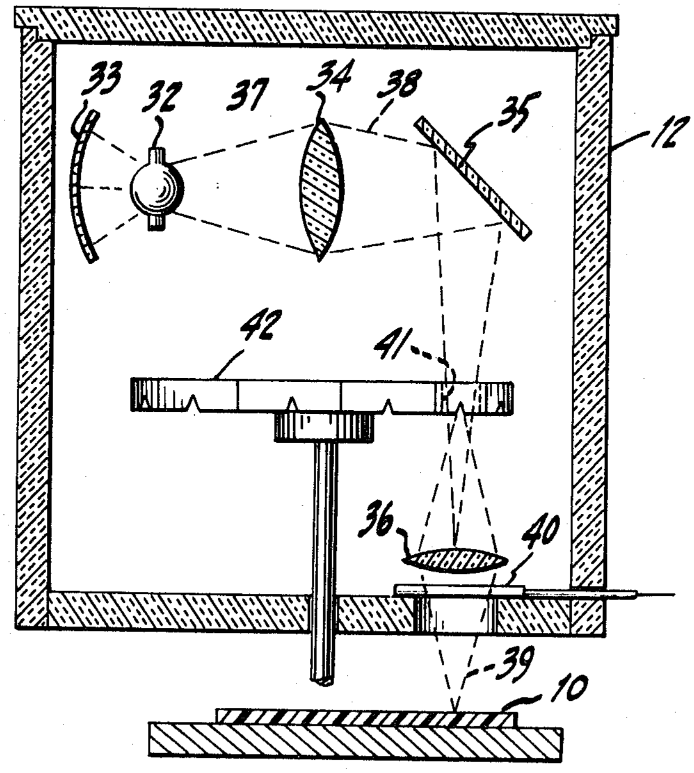
FIG. 2 is an enlarged sectional view of the imaging instrument taken along the line 2–2 in FIG. 1.

The sectional view in FIG. 2 shows the essential elements of the photoexposure head 12 as including a light source 32, a parabolic reflector 33, a condenser lens unit 34, a beam deflector 35, a projection lens unit 36, and a shutter unit 40 each suitably supported by means not shown. The light source 32 emits light in various directions, some of which is captured by the parabolic reflector 33. The parabolic reflector reflects this captured light back toward the light source 32 where it is combined with other light emitted by source 32 to form a diverging beam 37. The light beam 37 is focused by lens unit 34 to form a converging beam 38. The converging beam 38 is deflected at a right angle by deflector 35. The deflected beam is then shaped as it passes through one of the apertures 41 of aperture wheel 42. The projection unit 36 then projects a shaped imaging beam 39 which exposes the film 10. A shutter unit 40 is responsive to the image instrument control unit 28 to control the time exposure of the film 10 by the beam 39. The shutter unit serves to effectively turn the imaging beam 39 on and off. Pieces of neutral density filter material (not shown) are placed in each aperture position to control the light intensity relative to that aperture.

Figure 3:
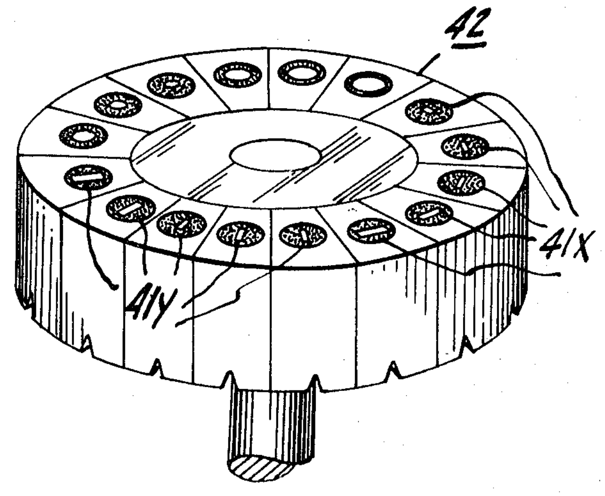
FIG. 3 is a perspective view of the aperture wheel of the imaging instrument.

The aperture 41 of the wheel 42 are best seen in the perspective view of FIG. 3. The different apertures 41 have different shapes and/or sizes to thereby provide different imaging shapes and/or widths for the imaging beam 39. The imaging width is herein defined as the width of the image exposed on the film 10 as distinguished from the actual size of the aperture. In one artwork tool some of the apertures are circular and others are rectangular or slit-shaped, as shown in FIG. 3. The diameters of the circular or round apertures vary from 0.005 inch to 0.180 inch. The slit apertures have lengths 0.005 inch and vary in width from 0.015 inch to 0.175 inch, the width being designated as the larger variable dimension for consistency with the image size or width nomenclature adopted below. Some of the slit apertures, designated 41X in FIG. 3, are arranged to provide on medium 10 a slit image of which the width is along the Y-direction, but which generate a bar-shaped image in the X-direction. The other slit apertures 41Y are arranged so that the widths of their corresponding images are along the X-direction to generate a bar-shaped image in the Y-direction. The aperture wheel 42 is responsive to the image instrument control unit 28 to position a selected aperture 41 in the path of the deflected beam. In the description which follows, the beam size, its imaging width and the aperture size, length or diameter will be used synonymously; that is, the imaging width will sometimes be referred to as the aperture size, diameter, or width.

Thus, the artwork generating tool is responsive to command signal sets to move the head from one position to another along either the horizontal X direction or the vertical Y direction or at any angle thereto. For any particular move, the photoexposure head 12 may be turned off or on with a selected aperture for the beam 39. In addition, the beam 39 may be flashed on the film 10 by appropriate D commands of the shutter unit 40.

The command numbers are capable of operating the artwork tool in either an absolute or an incremental mode. In the absolute mode, the X and Y command numbers command the head 12 to move to a selected point relative to an origin which is defined for the imaging surface. In the incremental mode, the command numbers command the head 12 to move a selected distance in a selected direction relative to the present position of the head.

DESCRIPTION OF PREFERRED EMBODIMENTS

In accordance with the process of the present invention, an artwork generating tool is employed to provide solid polygonal images on an imaging medium rapidly with relatively few movements of the tool's image producing means. For the example to be described, the artwork generating tool includes a photoexposure head as an imaging instrument and a photographic film as an imaging medium as pointed out above. It should also be noted at this point that the process of forming a solid polygonal image is applicable to all of the solid polygons contained in a particular artwork pattern. Thus, the process of the present invention would be employed to generate the solid polygonal images for the diffusion mask master in the previously described integrated circuit design application.

The pattern to be imaged on the photographic film may be prepared first on any suitable medium, such as drafting paper. The vertex points of the polygons contained in the pattern are then defined relative to one another so that the distances and directions therebetween can be ascertained. For example, the drafting paper may include vertical and horizontal unit lines, as in coordinate graph paper, whereby the vertical and horizontal displacements between two vertices can be ascertained. For either keyboard or tape entry to the artwork tool, these X and Y displacements are expressed as the X and Y command numbers.

Figure 4:
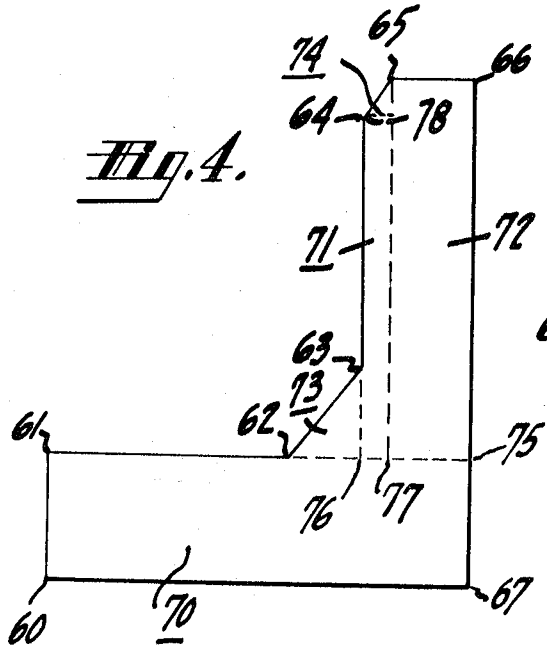
FIG. 4 is a plan view of an outline of an exemplary polygon and its partitioned parts.

The process of the present invention will now be described for forming an image of the polygon outline illustrated in FIG. 4. The FIG. 4 polygon is shown as having vertices 60 through 67 beginning at the lower left vertex and proceeding consecutively and clockwise around the figure. The FIG. 4 polygon by definition is a reentrant polygon and has two reentry angles, one at each of the vertices 62 and 63. A reentrant polygon is defined as one having one or more interior angles greater than 180°. On the other hand, a nonreentrant polygon is defined as one in which all of the interior angles are less than 180°. The particular polygon outline shown in FIG. 4 has been selected for purposes of illustration. It is understood, however, that the process of the invention is generally applicable to any polygon (reentrant or nonreentrant) capable of being partitioned into various parts or smaller polygons, some of which are rectangles.

The process includes the steps of initializing the imaging instrument or photoexposure head and then forming on the film a number of images which integrally form the overall image of the polygon. The image is integrally formed by recording images of a number of integral parts of the polygon.

In the initializing step, the photoexposure head is moved with the light beam turned off to a location over the film which corresponds to the area of the film where the polygon image is to be recorded. If the polygon is the first one of the pattern to be imaged, the head generally has a reference position, such as the origin for the absolute mode, or an initial position, such as a corner of the film for the incremental mode. On the other hand, if other portions of the pattern have already been imaged, the head has a position corresponding to the end point of its last movement.

Specifically, the head is moved to a positional or plotting point which may correspond to one of the polygon vertices, say vertex 60. The X and Y command numbers for the initializing step then correspond to the X and Y displacements of the head from its original position to a plotting point corresponding to the vertex 60. That is, the center point of the aperture or beam for either the round or slit apertures is positioned over the initial plotting point. This initializing movement of the head, for example, could be achieved with a single block of information consisting of X, Y and D command numbers.

In the next step of the process, an image of the polygon is formed on the film by recording a number of smaller adjacent polygonal images which integrally form the image of the overall polygon. In this step the polygon to be recorded is partitioned into a number of integral parts. The time required by the artwork tool to form the image is reduced by selecting the integral parts as rectangles whenever practical so that major portions of the polygonal image can be formed with the widest available images which will fit within a particular rectangular area of the film.

Any given polygon can be partitioned in many different ways such that some of the partitioned portions are rectangular. In a preferred form of the invention, one of the two polygon sides which defines a reentry angle is extended to the interior of the figure until it intersects either another polygon side or another interior extension. Thus in the FIG. 4 example, the given polygon is shown as partitioned by dashed lines into three rectangular polygons 70, 71 and 72 and two triangular polygons 73 and 74. One side of rectangle 70 is formed by an interior extension of the polygon side 61—62 from the reentrant vertex 62 to a point 75 on the polygon side 66—67. The remaining sides of rectangle 70 are defined by the polygon sides 60—61 and 60—67 and the portion 67—75 of polygon side 66—67. Similarly, the polygon side 63—64 is extended to the interior from reentrant vertex 63 to point 76 on interior dashed extension 62—75.

The interior extensions from the reentrant vertices thus partition the given polygon into three nonreentrant parts, namely, rectangle 70, a triangle 73 and a5 irregular polygon having vertices 64, 65, 66, 75 and 76. The irregular nonreentrant polygon can be further partitioned to provide rather large rectangular areas 71 and 72 as shown by the dashed lines 65—67 and 64—78 and the small triangle 74. The triangles 73 and 74 could be further partitioned to each form a rectangle and two triangles. There is a trade-off, however, as to the number of X, Y and D commands required to fill a triangle as compared to the number of commands required to fill two smaller triangles and a rectangle. Generally, for relatively small triangles the trade-off is in favor of no further partitioning.

Figure 5:
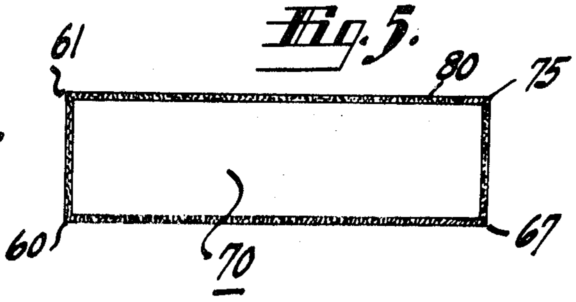
FIG. 5 is a plan view showing an outline image for one of the rectangular integral parts of the FIG. 4 polygon.
Figure 7:
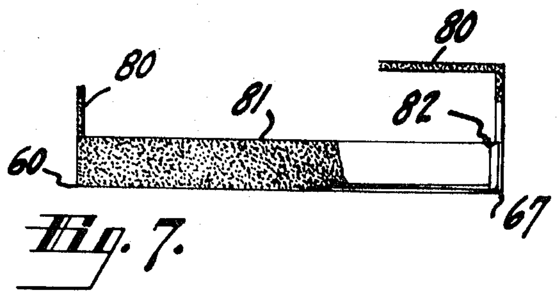
FIGS. 7 and 8 are plan views, partly in phantom, showing the outline image and interior bar-shaped images which integrally form an image of the rectangular parts in accordance with the process of the present invention.
Figure 8:
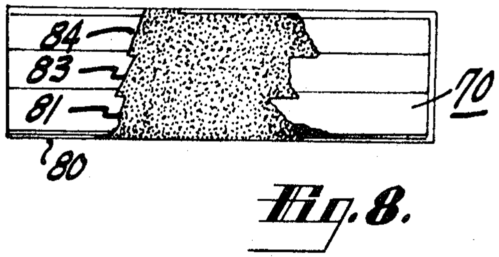

In the recording step, images are recorded on the film for each of the partitioned parts of a given polygon so as to integrally form the overall polygonal image. Referring to FIG. 5, the recording step will now be described for forming an image of the rectangle 70. In FIGS. 5, 7 and 8, the shaded areas correspond to an exposed image and the light portions correspond to the unexposed photographic film. Preferably, a border or outline image 80 is first recorded for the rectangle 70, especially where relatively accurate edge definition is required. It is noted, however, that an outline image is unnecessary where extreme accuracy is not required. To form the outline image 80, a relatively small-sized, round aperture, for example, the smallest one in wheel 42 (FIG. 3) is selected by the D command in order to provide the best possible point definitions for the vertices of the imaged polygon. That is, the circular image beam 39 (FIG. 2) will provide rounded vertex points. However, this is usually tolerable because the 0.005 inch wide beam of the above-described artwork apparatus is far smaller than the polygon usually produced. The outline image 80 is shown in FIG. 5, for example, as having a considerably larger width than 0.005 inch for ease of illustration.

Figure 6:
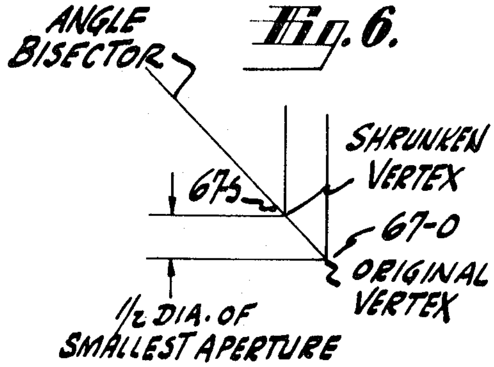
FIG. 6 is an enlarged plan view of one of the vertices of FIG. 4 polygon.

At this point it should be mentioned that, due to the width of the 0.005 inch beam, the X and Y commands should be given not for the actual vertices of the original polygon to be imaged but for the vertices of a shrunken version of the original polygon. The vertices of the shrunken polygon are located along the vertex angle bisectors a distance toward the interior of the figure such that the shrunken sides are one-half of the diameter of the smallest aperture away from the original sides. This is best shown in FIG. 6 which is an enlarged phantom view of vertex 67, showing the original vertex **67*o* and the shrunken vertex 67*s* located along the angle bisector. The distance between the original and shrunken sides is one-half the diameter of the smallest aperture or 0.0025 inch for the present example. Thus, it is noted that the X, Y and D commands for the initializing head movement, represent the shrunken vertex plotting point 67*s*, rather than the original vertex plotting point 67*o***.

The outline image 80 as shown in FIG. 5 is then produced by a series of blocks of commands which move the head with the beam turned on in a selected direction around the boundary of the rectangular polygon 70. For example, for a clockwise direction, the first block of commands would cause the head to move from vertex 67 to vertex 60. The second block would cause the head to move from vertex 60 to vertex 61 and so on until the head is returned to vertex 67 to form the outline image as shown in FIG. 5.

After the outline image 80 has been recorded, the interior of the rectangle is then imaged with rectangular or bar-shaped images which overlap with one another and with the outline image to integrally form the overall rectangular image. In the generation of the bar-shaped images, the slit apertures 41X are employed if the longer dimension of the rectangle is in the X direction. On the other hand, if the longer dimension is in the Y-direction, the slit apertures 41Y of FIG. 3 are employed. Since the longer dimension of rectangle 70 is in the X direction, the largest one of the slit apertures 41X (FIG. 3) which will fit within the remaining interior of the unexposed area of rectangle 70 is selected. Several situations can arise. First, one of the slit apertures 41X exactly fits the unexposed area with a desired degree of overlap with the border image 80. For such case, only two blocks of commands are necessary to form the rectangular image, one for the starting plotting point and one for the ending plotting point.

Second, none of the available slit apertures 41X exactly fits the unexposed interior area of the rectangle with a desired degree of overlap with the outline image 80. In such case, two or more bar-shaped images are employed to record an image of the rectangle 70. This latter situation is assumed to be the case for the rectangle 70.

Referring now to FIG. 7, a portion of the border image 80 about the vertex 67 is shown partly in phantom in order to illustrate the positioning of the photoexposure head and the aperture selection of the exposure being for the first bar-shaped image 81. The width of the image 81 corresponds to the width of the largest of the slit apertures 41X. In FIG. 7, the bar-shaped image 81 is shown to overlap with outline image 80 and to extend from vertex 67 toward vertex 60.

Figure 9:
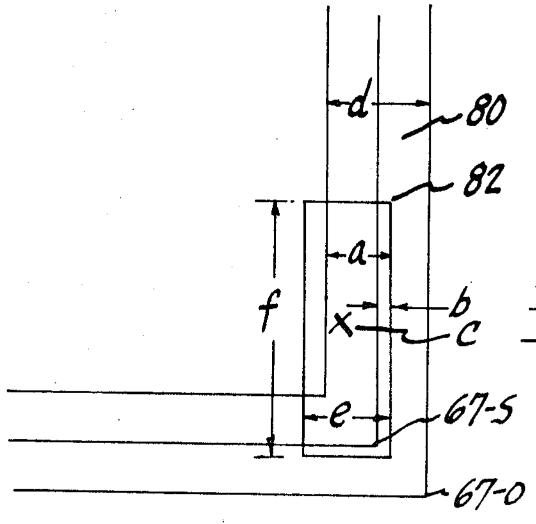
FIG. 9 is an enlarged view, in phantom, of the area about vertex 67 of the FIG. 5 outline image.

To generate the bar-shaped image 81, a first block of X, Y and D commands moves the photoexposure head from its final border or outline image position at vertex 67 to the position shown by aperture 82. A second block of commands would then move the head with the light beam on in the X direction toward vertex 60 to complete the image 81. The positional or plotting points for the start and end of image 81 can be readily determined. As an example, the starting plotting point C for aperture 82 is shown in the enlarged phantom view of FIG. 9 for a desired overlap *a* in the X and Y directions. For this example, the overlap *a* extends beyond the shrunken vertex 67*s* by a distance *b*. The distance *d* is the width of the outline image 80. The distances *e* and *f* are the length and widths, respectively, of the slit aperture 82. The plotting point *c* then can be simply determined since the shrunken vertex 67*s* and each of the distances *a*,*b*,*d*,*e* and *f* are known.

The remaining interior unexposed area is then similarly filled or imaged with bar-shaped images 83 and 84, as shown in FIG. 8. The FIG. 8 view of rectangle 70 is shown, partly in phantom, in order to demonstrate the overlapping of the different images 80, 81, 83 and 84. The images 81 and 83 have substantially identical width. That is, the widest one of the slit apertures 41Y is employed for each of the images 81 and 83. The image 84 has a somewhat smaller width corresponding to one of the smaller width apertures 41Y.

The other two rectangles 71 and 72 (FIG. 4) are recorded on the film in a manner similar to the rectangle 70. However, the slit apertures 41X are employed to record the images for rectangles 71 and 72 since their longer dimensions are in the Y direction. The triangles 73, 74 may be recorded on the film with the use of any suitable process, such as the one described in the aforementioned Rosenfeld, et al. application. The images of rectangles 70, 71 and 72 and of triangles 73 and 74 integrally form the image of the given polygonal figure shown in FIG. 4.

What we claim is:

1. A process for recording a filled-in polygon on an imaging medium with a recording device having selectable round and rectangular recording images of different dimensions comprising the steps of extending one of the sides of a reentrant polygon adjacent a reentrant angle through the polygon to an intersection with an opposite side;

reducing the polygon to a plurality of rectangular images; and filling in the interior of each rectangular image with the largest recording image that will not extend beyond the borders of that rectangular image.

2. The process as claimed in claim 1 wherein all recording with a given recording image is completed before selecting another recording image.

UNITED STATES PATENT OFFICE
CERTIFICATE OF CORRECTION

Patent No. 3,600,513 Dated August 17, 1971

Inventor(s) Charles R. Pendred & Stephen Marrs Petty

It is certified that error appears in the above-identified patent and that said Letters Patent are hereby corrected as shown below:

Col. 1, after the title and before "BACKGROUND OF INVENTION" insert the following:

---The invention herein described was made in the course of or under a contract or subcontract thereunder with the Department of the Army.

Cross References

A patent application, Serial No. 742,909, entitled PROCESS FOR RECORDING SOLID POLYGONAL IMAGES, filed concurrently herewith, by Robert L. Rosenfeld and Lawrence A. Rempert, and assigned to the present assignee, describes a polygonal imaging process which may be employed in conjunction with the process of the present invention.---

Col. 2, between lines 43 and 44 insert --- Introduction ---
Col. 4, line 28, "aperture" should be --- apertures ---
Col. 4, line 61, "of" should be --- to ---
Col. 6, line 21, "a5" should be --- an ---
Col. 6, line 48, "image" should be --- imaging ---

Signed and sealed this 7th day of March 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334